United States Patent
Fan et al.

(10) Patent No.: US 6,963,600 B1
(45) Date of Patent: Nov. 8, 2005

(54) ADAPTIVE INTERFERENCE-FREE SPREAD-SPECTRUM SYSTEM EMPLOYING BINARY CODE SEQUENCE SETS WITH ZERO CORRELATION ZONE PROPERTIES

(75) Inventors: Pingzhi Fan, Bei Yuan, Flat No. 18105, Southwest Jiaotong University, Chengdu, Sichuan, 610031 (CN); Naoki Suehiro, 18-14, Azuma 3-chome, Tsukuba-shi, Ibaraki 305-0031 (JP); Noriyoshi Kuroyanagi, 7-1204, Sakuragaoka-danchi, 44-14, Sakuragaoka 3-chome, Higashiyamato-shi, Tokyo 207-0022 (JP)

(73) Assignees: Pingzhi Fan, Sichuan (CN); Naoki Suehiro, Ibaraki (JP); Noriyoshi Kuroyanagi, Tokyo (JP); Toyo Communication Equipment Co., Ltd., Kanagawa (JP); Daiei Electronics Co., Ltd., Tokyo (JP)

( * ) Notice: Subject to any disclaimer, the term of this patent is extended or adjusted under 35 U.S.C. 154(b) by 0 days.

(21) Appl. No.: 09/647,557

(22) PCT Filed: Jan. 26, 2000

(86) PCT No.: PCT/JP00/00373

§ 371 (c)(1),
(2), (4) Date: Dec. 21, 2000

(87) PCT Pub. No.: WO00/45530

PCT Pub. Date: Aug. 3, 2000

(30) Foreign Application Priority Data

Jan. 29, 1999 (JP) ............................... 11-023252

(51) Int. Cl.⁷ ............................ H04B 1/69; H04B 7/216

(52) U.S. Cl. ..................... 375/141; 375/130; 370/320
(58) Field of Search ................................. 375/141, 147, 375/138, 149, 130; 370/342, 203, 320

(56) References Cited

U.S. PATENT DOCUMENTS

| 16,733 | A | * | 3/1857 | Cha ............................ 81/167 |
| 5,615,227 | A | * | 3/1997 | Schumacher et al. ........ 375/142 |
| 5,914,943 | A | * | 6/1999 | Higuchi et al. ............. 370/320 |
| 6,009,090 | A | * | 12/1999 | Oishi et al. .................. 370/342 |
| 6,041,034 | A | * | 3/2000 | Fukumasa et al. .......... 370/203 |
| 6,331,997 | B1 | * | 12/2001 | Li ............................... 375/130 |
| 6,452,958 | B1 | * | 9/2002 | van Nee ...................... 375/130 |

OTHER PUBLICATIONS

Cha, Jae-sang, A class of multi-level spreading codes with enhanced ZCD property, Department of Information and Communication, SeoKyeong Univ, p. 1-4.*

Y. Han, On the Minimization of Overhead in Channel Impulse Response Measurement, IEE Trans. Veh. Technol., vol. 47, No. 2, pp. 631-632, May 1998.*

E.J. Cruselles et al., "Spreading Codes Generator for Wireless CDMA Networks", *Wireless Personal Communications*, NL, Kluwer Academic Publishers, vol. 7, No. 1, May 1, 1998, pp. 69-86.

(Continued)

*Primary Examiner*—Amanda T. Le
*Assistant Examiner*—Cicely Ware
(74) *Attorney, Agent, or Firm*—Koda & Androlia (57) ABSTRACT

A direct sequence spread spectrum system consisting of modulator and demodulator wherein the spreading sequence with zero correlation zone properties, and the despreading consists of multiplying the received signal with the same spreading sequence, followed by a low pass filter, decoder and deinterleaver. The bit rate of the spreading sequence for each user is normally much higher than the input encoded data bit rate, and therefore it spreads the system spectrum.

11 Claims, 8 Drawing Sheets

Crosscorrelation Function and its zero zone $Z_{CCZ}$

Autocorrelation Function and its zero zone $Z_{ACZ}$

OTHER PUBLICATIONS

M. Tanimoto et al., "Synchronous Spread-Spectrum Multiplex Communication System Using a Modified M-Sequence", *Electronics and Communications in Japan*, Jul., 1984, USA, vol. 67, No. 7, pp. 70-77.

J. Wolfmann, "Almost Perfect Autocorrelation Sequences", *IEEE Transactions on Inforamtion Theory*, US, IEEE Inc. New York, vol. 38, No. 4, Jul. 1, 1992, pp. 1412-1418.

* cited by examiner

Crosscorrelation Function
and its zero zone $Z_{CCZ}$

Autocorrelation Function
and its zero zone $Z_{ACZ}$

Figure 9a: CCF and ACF Examples for ZCZ Sequence Set $(L,M,Z_{CZ})=(1664,16,105)$ Figure 9b: CCF and ACF Examples for ZCZ Sequence Set $(L,M,Z_{CZ})=(1280,16,81)$ Figure 9c: CCF and ACF Examples for ZCZ Sequence Set $(L,M,Z_{CZ})=(1024,16,65)$ Figure 9d: CCF and ACF Examples for ZCZ Sequence Set $(L,M,Z_{cz})=(832,16,53)$ Figure 9e: CCF and ACF Examples for ZCZ Sequence Set $(L,M,Z_{cz})=(640,16,41)$ Figure 9f: CCF and ACF Examples for ZCZ Sequence Set $(L,M,Z_{cz})=(512,16,33)$

Figure 10

Figure 10a: Aperiodic CCF & ACF Examples for ZCZ Sequence Set $(L,M,Z_{cz})=(1664,16,105)$ Figure 10b: Aperiodic CCF & ACF Examples for ZCZ Sequence Set $(L,M,Z_{cz})=(1280,16,81)$ Figure 10c: Aperiodic CCF & ACF Examples for ZCZ Sequence Set $(L,M,Z_{cz})=(1024,16,65)$ Figure 10d: Aperiodic CCF & ACF Examples for ZCZ Sequence Set $(L, M, Z_{cz}) = (832, 16, 53)$ Figure 10e: Aperiodic CCF & ACF Examples for ZCZ Sequence Set $(L, M, Z_{cz}) = (640, 16, 41)$ Figure 10f: Aperiodic CCF & ACF Examples for ZCZ Sequence Set $(L, M, Z_{cz}) = (512, 16, 33)$ 200
ADAPTIVE INTERFERENCE-FREE SPREAD-SPECTRUM SYSTEM EMPLOYING BINARY CODE SEQUENCE SETS WITH ZERO CORRELATION ZONE PROPERTIES This Application is a 371 of PCT/JP00/00373 Jan. 26, 2000.

BACKGROUND OF THE INVENTION

1. Field of the Invention

The present invention relates to a binary direct sequence (DS) spread spectrum (SS) system, particularly a DS CDMA system, working in an interference-free mode by employing binary spreading sequence sets having zero correlation zone (ZCZ) properties, so as to eliminate the multiple access interference and other counter measures encountered in the system.

2. Description of the Background Art

Future digital communication systems will be characterized by high throughput, integrated services, and flexibility. The direct sequence (DS) spread spectrum (SS) systems, especially DS-SS code-division multiple access (CDMA) approaches have been proposed for a variety of digital cellular mobile and wireless personal communication systems. Cellular CDMA systems offer a range of potential advantages over TDMA or FDMA systems, such as high spectrum efficiency, graceful degradation, multipath resistance, inherent frequency diversity and interference rejection, and so on.

Figure 1:
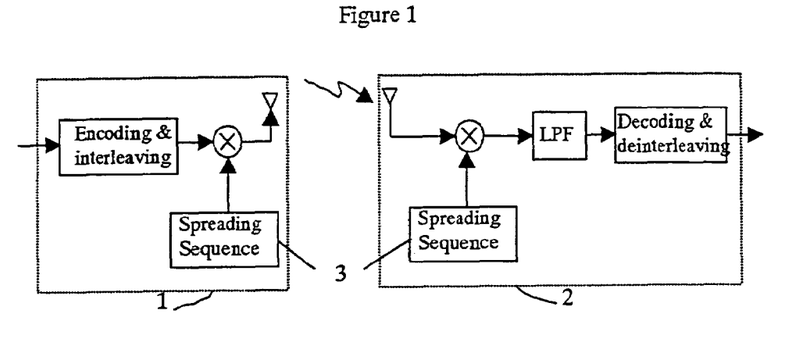
FIG. 1 is a baseband model of DS spread spectrum system.

A typical direct sequence (DS) spread spectrum system, as shown in FIG. 1, consists of modulator (1) and demodulator (2), where the spreading consists of multiplying the input encoded and interleaved data by a binary spreading sequence (3), and the despreading consists of multiplying the received signal with the same binary spreading sequence (3), followed by a low pass filter (LPF), decoder and de-interleaver. The bit rate of spreading sequence for each user is normally much higher than the input encoded data bit rate, and therefore spreading the system spectrum. The ratio of spreading sequence bit rate to input data rate is called spreading factor (SF). When the signal is received at the receiver, the spreading is removed from the desired signal due to the impulsive-like autocorrelation property of the spreading code. When despreading is applied to the interference generated by other user's signals, there is no despreading. That is, each spread spectrum signal should behave as if it were uncorrelated with every other spread signal using the same band. Therefore, CDMA codes are designed to have very low autocorrelation sidelobes (preferably zero sidelobes) and very low cross-correlations (preferably zero cross-correlations).

Given a sequence set $\{a^{(r)n}\}$ with family size M (the number of sequences in the set), $r=1,2,3,\ldots,M$, $n=0,1,2,3,\ldots,L-1$, each sequence is of length L, then one can define the following periodic Auto-Correlation Function (ACF, $r=s$) and Cross-Correlation Function (CCF, $r \neq s$)

$$R_{r,s}(\tau) = \sum_{n=0}^{L-1} a_n^{(r)} a_{n+\tau}^{(s)}$$

where the subscript addition $n+\tau$ is performed modulo L.

In ideal case, it is required that the ACF should behave as an impulse, and the CCF should be zeros everywhere. However, it has been proved that it is impossible to design a set of spreading codes with ideal impulsive autocorrelation functions and ideal zero crosscorrelation functions, thus resulting co-channel interference in practical CDMA systems. Generally speaking, the code length L, code family size M, the maximum autocorrelation sidelobe $R_{amax}$, and the maximum crosscorrelation value $R_{cmax}$ are bounded by certain theoretical limits, such as Welch bound, Sidelnikov bound, Sarwate bound, Levenshtein bound, etc.

Apart from the local noise that is irreducible, there are three kinds of interference which affects the DS CDMA system capacity and system performance, that is, intersymbol interference (ISI), multiple access interference (MAI) and adjacent cell (or channel) interference (ACI). However, all the three kinds of interference can be reduced or even eliminated by employing good multiple access spreading codes.

In order to reduce the interference encountered in the DS CDMA system, a number of patents have been published. However, most of the approaches published so far use sophisticated interference cancellers, fast and accurate transmitting power control, variable-rate transmission, and other complicated techniques at the receiver. One previous patent, PCT/CN98/00151 (CN1175828A), uses ternary spreading sequences with limited number of sequences and zero correlation region; another patent, PCT/JP97/03272(JP271858/96), adopts spreading sequences with comb-shaped spectrum.

The present invention was devised in light of the above facts and the object of the present invention is to provide a binary coded direct sequence (DS) spread spectrum (SS) communication system which is characterized by the fact that the binary spreading sequence set of length L and size M used in the system having a zero correlation zone $Z_{CZ}$ in their periodic autocorrelation functions on both sides of the zero shift and a zero correlation zone $Z_{CZ}$ in the periodic cross-correlation functions including the zero shift between any pair of spreading sequences belonging to the code sequence set; and the said spreading code sequence set has length $L=2\times 2^i \times 10^j \times 26^k$, where i, j, k can be zeroes or any positive integers, and family size $2<M<L$, and zero correlation zone $Z_{CZ} \leq L/M+1$ for any permitted values of i, j, k, or $Z_{CZ}=L/M+1$ for $j=k=0$ and any permitted value of i; and includes ZCZ sequences and further includes a means for generating a central frame by multiplying a binary input and said ZCZ sequence(s), and additional guard sequence enclosing the central frame, the additional guard sequences being extracted from parts of the central frame. In this way, the multiple access interference, multipath interferences and other central measures can be eliminated efficiently.

Furthermore, the objects of the present invention are to provide sets of binary sequences with specified length, family size and required ZCZ, so that the system can work in an interference-free mode and can be made adaptive to the channel conditions.

Furthermore, the object of the present invention is to provide a DS CDMA system where the conventional intra-cell short channelization codes such as Walsh orthogonal codes or variable-length orthogonal codes are replaced with the binary sequences with big zero correlation zone, which makes it possible to eliminate the inter-path interference.

Furthermore, the object of the present invention is to provide a DS CDMA system with intercell synchronous operation where the conventional long scrambling code (also called pseudo-noise code) such as m-sequence is replaced with a binary code with big zero correlation zone, which makes it possible to eliminate the multiple access interference.

Furthermore, the object of the of the present invention is to provide a DS CDMA system with intercell asynchronous operation where the conventional long scrambling codes such as Gold codes or Kasami codes are replaced with binary ZCZ codes as presented in this invention, which makes it possible to eliminate the multiple access interference.

Furthermore, the object of the present invention is to provide an adaptive DS CDMA system by allocating each transmitter a subset of sequences with different ZCZs, so that the transmitter can select a suitable spreading sequence according to channel conditions or system instructions.

Furthermore, the DS CDMA system described above is supplied for down-link communication under the condition of synchronous transmission and for up-link communication under the condition of asynchronous transmission.

SUMMARY OF THE INVENTION

Figure 2:
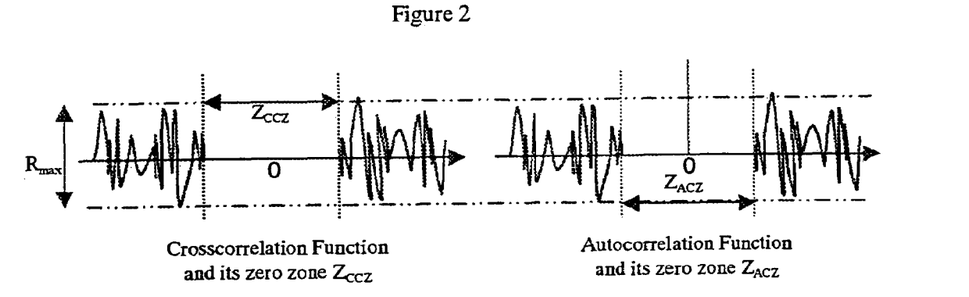
FIG. 2 describes the definition of zero correlation zone, i.e. zero auto-correlation zone $Z_{ACZ}$, zero cross-correlation zone $Z_{CCZ}$, and zero correlation zone $Z_{CZ}=\text{Min}\{Z_{ACZ}, Z_{CCZ}\}$.

Although it is impossible to design a set of spreading codes with ideal impulsive autocorrelation functions and ideal zero crosscorrelation functions, it is, however, possible to construct a set of sequences, which possess zero correlation zones in the ACF/CCF. The zero correlation zone denoted as $Z_{CZ}$ is illustrated in FIG. 2 and defined by the following formulas:

$$R_{r,s}(\tau) = \sum_{n=0}^{L-1} a_n^{(r)} a_{n+\tau}^{(s)} = \begin{cases} L, & \tau = 0, & r = s \\ 0, & 0 < |\tau| \le \frac{Z_{ACZ}-1}{2}, & r = s \end{cases}$$

$$R_{r,s}(\tau) = \sum_{n=0}^{L-1} a_n^{(r)} a_{n+\tau}^{(s)} = 0, 0 \le |\tau| \le \frac{Z_{CCZ}-1}{2}, r \ne s$$

$$Z_{CZ} = \text{Min}\{Z_{ACZ}, Z_{CCZ}\}$$

It should be noted that, although, a symmetrical $Z_{ACZ}$ or $Z_{CCZ}$ is assumed in above formulas, in general, the actual ZCZ may not be symmetical to the zero shift.

For simplicity and convenience, the in-phase position ($\tau=0$) of autocorrelation function (ACF peak) is considered to be included in the zero correlation zone. It is therefore that, the zero correlation zone $Z_{ACZ}$ or $Z_{CCZ}$ is an odd number, i.e. the in-phase position plus two side zero positions. If $Z_{ACZ}=Z_{CCZ}$, then $Z_{CZ}=\text{Min}\{Z_{ACZ}, Z_{CCZ}\}=Z_{ACZ}=Z_{CCZ}$, as is the case of this invention. In addition, only periodic correlations are considered here. The reason will be explained later.

In order to accomplish the above-described objects, the binary coded direct sequence spread spectrum communication system which is characterized by the fact that the binary spreading sequence set of length and size M used in the system had a zero correlation zone $Z_{CZ}$ in their periodic autocorrelation functions on both sides of the zero shift and a zero correlation zone $Z_{CZ}$ in the periodic cross-correlation functions including the zero shift between any pair of spreading sequences belonging to the code sequence set; and the said spreading code sequence set of length $L=2\times2^i\times10^j\times26^k$, where i, j, k can be zeroes or any positive integers, and family size 2<M<L, and zero correlation zone $Z_{CZ} \le L/M+1$ for any permitted values of i, j, k or $Z_{CZ}=L/M+1$ for j=k=0 and any permitted value of i; and the frame format used in the system is composed of a central frame which is made by multiplying the binary input and the said ZCZ sequence(s), and additional guard sequences enclosing the central frame, extracted from parts of the central frame.

Furthermore, the binary coded direct sequence spread spectrum communication system which is characterized by the fact that in the binary spread spectrum communication system according to claim 1, the said spreading sequences are formed recursively from a starter set with two sequences of length 2 and zero correlation zone $Z_{CZ}=1$ or length L>2 with zero correlation zone $Z_{CZ}=L/2+1$, or formed by half-truncating a set of ZCZ sequences where the maximum number of truncations is equal to the number of recursions used in constructing the ZCZ sequence set.

Furthermore, the cellular binary coded direct sequence CDMA communication system which is characterized by the fact that, the channelization spreading sequences of all users communicating in the same cell are chosen from a ZCZ code sequence set.

Furthermore, the cellular binary coded direct sequence CDMA communication system which is characterized by the fact that, a binary ZCZ sequence of length L with $Z_{CZ} \ge L/2+1$ is chosen as the scrambling code sequence used for intercell synchronous operation.

Furthermore, the cellular binary coded direct sequence CDMA communication system which is characterized by the fact that, the scrambling code sequences used for intercell asynchronous operation are chosen from a ZCZ code sequence set.

Furthermore, the cellular binary coded direct sequence CDMA system is characterized by the fact that each transmitter at the base station and mobile station is allocated a single ZCZ spreading sequence or a subset of ZCZ spreading sequences chosen from a ZCZ code set.

Furthermore, the cellular binary coded direct sequence CDMA system is applied for down-link communication under the condition of synchronous transmission and for up-link communication under the condition of asynchronous transmission.

DESCRIPTION OF THE PREFERRED EMBODIMENTS

Preface

For better understanding of this invention, we will first describe various methods of constructing the sequence sets with desired ZCZ properties, then give the detailed description of the adaptive interference-free DS spread spectrum system, anti-multipath-interference DS CDMA system, anti-cochannel-interference DS CDMA system by employing the ZCZ code sets, and finally, present the extended framing method for practical implementation.

In regards to general code sequence set design method, the present inventors have published a number of publications, especially the book, "Pingzhi Fan and Michael Darnell, Sequence Design for Communications Applications, Research Studies Press, John Wiley & Sons Ltd, London, 1996, ISBN 0-471-96557-x, 516 pages", and the paper, "P. Z. Fan and M. Darnell, On the construction and comparison of periodic digital sequence sets, IEEE Proceedings Communications, Vol. 144, No. 6, pp. 111—117, 1997".

As for the binary sequence design with zero correlation zone, there are a few papers, such as "Y. Han, On the minimization of overhead in channel impulse response measurement, *IEEE Trans. Veh. Technol.*, vol. 47, no. 2, pp. 631–636, May 1998", "J. Wolfmann, Almost perfect autocorrelation sequences, *IEEE Trans. Inform. Theory*, vol. 38, no. 4, pp. 1412–1418, July 1992", and "X. M. Deng and P. Z. Fan, Comment on 'On the Minimization of Overhead in Channel Impulse Response Measurement', submitted to *IEEE Trans. Veh. Technol.*, September 1998", which present some results on a single ZCZ sequence with short length, mainly based on computer search.

Up to now, there is no systematic construction for binary ZCZ sequence set with family size larger than 2. According to the zero correlation zone defined above this invention presents several new systematic constructions of ZCZ code sequences with large family size and variable ZCZ values, as described below.

ZCZ Sequence Set Construction-I

Let $F^n$ be a ZCZ sequence set with family size M, sequence length L, and zero correlation zone $Z_{CZ}$, or in short, $F(L,M,Z_{CZ})$. To start, let n=0, a basic starter set is chosen as $$F^0 = \begin{bmatrix} F^0_{11} & F^0_{12} \\ F^0_{21} & F^0_{22} \end{bmatrix}_{2\times 2} = \begin{bmatrix} -1 & 1 \\ -1 & -1 \end{bmatrix}_{2\times 2}$$

which is a ZCZ sequence set $F(L,M,Z_{CZ})=(2,2,1)$. Now denote $L_0=2$, the sequence length of starter. From the starter, one can construct a larger ZCZ sequence set $F(L,M,Z^{cz})=(2^{2n} L_0, 2^{n+1}, 2^n+1)=(8,4,3)$, n=1, by the following formula, $$F^1 = \begin{bmatrix} F^1_{11} & F^1_{12} & F^1_{13} & F^1_{14} \\ F^1_{21} & F^1_{22} & F^1_{23} & F^1_{24} \\ F^1_{31} & F^1_{32} & F^1_{33} & F^1_{34} \\ F^1_{41} & F^1_{42} & F^1_{43} & F^1_{44} \end{bmatrix} =$$

$$\begin{bmatrix} F^0_{11}F^0_{11} & F^0_{12}F^0_{12} & (-F^0_{11})F^0_{11} & (-F^0_{12})F^0_{12} \\ F^0_{21}F^0_{21} & F^0_{22}F^0_{22} & (-F^0_{21})F^0_{21} & (-F^0_{22})F^0_{22} \\ (-F^0_{11})F^0_{11} & (-F^0_{12})F^0_{12} & F^0_{11}F^0_{11} & F^0_{12}F^0_{12} \\ (-F^0_{21})F^0_{21} & (-F^0_{22})F^0_{22} & F^0_{21}F^0_{21} & F^0_{22}F^0_{22} \end{bmatrix} =$$

$$\begin{bmatrix} -- & ++ & +- & -+ \\ -- & -- & +- & +- \\ +- & -+ & -- & ++ \\ +- & +- & -- & -- \end{bmatrix}_{4\times 8}$$

where $(-F^0_{ij})$ is formed by negating sequence $F^0_{ij}$, each row of $F^1$ is a ZCZ sequence required.

From the ZCZ sequence set $F^1$, another ZCZ sequence set $F^2$, i.e. $F(L,M,Z_{CZ})=(2^{2n} L_0, 2^{n+1}, 2^n+1)=(32,8,5)$, n=2, can be synthesized by a similar formula, $$F^2 = \begin{bmatrix} F^2_{11} & F^2_{12} & F^2_{13} & F^2_{14} & F^2_{15} & F^2_{16} & F^2_{17} & F^2_{18} \\ F^2_{21} & F^2_{22} & F^2_{23} & F^2_{24} & F^2_{25} & F^2_{26} & F^2_{27} & F^2_{28} \\ F^2_{31} & F^2_{32} & F^2_{33} & F^2_{34} & F^2_{35} & F^2_{36} & F^2_{37} & F^2_{38} \\ F^2_{41} & F^2_{42} & F^2_{43} & F^2_{44} & F^2_{45} & F^2_{46} & F^2_{47} & F^2_{48} \\ F^2_{51} & F^2_{52} & F^2_{53} & F^2_{54} & F^2_{55} & F^2_{56} & F^2_{57} & F^2_{58} \\ F^2_{61} & F^2_{62} & F^2_{63} & F^2_{64} & F^2_{65} & F^2_{66} & F^2_{67} & F^2_{68} \\ F^2_{71} & F^2_{72} & F^2_{73} & F^2_{74} & F^2_{75} & F^2_{76} & F^2_{77} & F^2_{78} \\ F^2_{81} & F^2_{82} & F^2_{83} & F^2_{84} & F^2_{85} & F^2_{86} & F^2_{87} & F^2_{88} \end{bmatrix} =$$

$$\begin{bmatrix} ++++ & ++++ & -+-+ & -+-+ & --++ & --++ & +--+ & +--+ \\ -+-+ & -+-+ & ++++ & ++++ & +--+ & +--+ & --++ & --++ \\ ++++ & ---- & -+-+ & +-+- & --++ & ++-- & +--+ & -++- \\ -+-+ & +-+- & ++++ & ---- & +--+ & -++- & --++ & ++-- \\ --++ & --++ & +--+ & +--+ & ++++ & ++++ & -+-+ & -+-+ \\ +--+ & +--+ & --++ & --++ & -+-+ & -+-+ & ++++ & ++++ \\ --++ & ++-- & +--+ & -++- & ++++ & ---- & -+-+ & +-+- \\ +--+ & -++- & --++ & ++-- & -+-+ & +-+- & ++++ & ---- \end{bmatrix}_{8\times 32}$$

where $F^2_{ij}$ and $F^2_{(i+4)(j+4)}$, is given by $$F_{ij}^2 = F_{ij}^1 F_{ij}^1, \quad \ldots \quad F_{i4}^2 = F_{i4}^1 F_{i4}^1, \quad F_{i5}^2 = (-F_{ij}^1)F_{ij}^1, \quad \ldots \quad F_{i8}^2 = (-F_{i4}^1)F_{i4}^1$$

$$F_{(i+4)1}^2 = F_{i5}^2, \quad \ldots \quad F_{(i+4)4}^2 = F_{i8}^2, \quad F_{(i+4)5}^2 = F_{i1}^2, \quad \ldots \quad F_{(i+4)8}^2 = F_{i4}^2$$

In general, from the ZCZ sequence set $F^{n-1}$ or $F(L,M,Z^{cz})=(2^{2(n-1)}L_0, 2^n, 2^{n-1}+1)$, a larger ZCZ sequence set $F^n$ or $F(L',M',Z'_{CZ})=(2^{2n}L_0, 2^{n+1}, 2^n+1)$ can be synthesized, as shown below.

$$F^n = \begin{bmatrix} F_{11}^n & \cdots & F_{1M}^n & F_{1(M+1)}^n & \cdots & F_{1(2M)}^n \\ F_{21}^n & \cdots & F_{2M}^n & F_{2(M+1)}^n & \cdots & F_{1(2M)}^n \\ \cdots & \cdots & \cdots & \cdots & \cdots & \cdots \\ \cdots & \cdots & \cdots & \cdots & \cdots & \cdots \\ F_{(2M-1)1}^n & \cdots & F_{(2M-1)M}^n & F_{(2M-1)(M+1)}^n & \cdots & F_{(2M-1)(2M)}^n \\ F_{(2M)1}^n & \cdots & F_{(2M)M}^n & F_{(2M)(M+1)}^n & \cdots & F_{(2M)(2M)}^n \end{bmatrix}_{M' \times L'}$$

where $F^n_{ij}$ and $F^n_{(i+M)(j+M)}$, $1 \leq i, j \leq M$, is given by $$F_{ij}^n = F_{ij}^{n-1} F_{ij}^{n-1}, \quad \ldots \quad F_{iM}^n = F_{iM}^{n-1} F_{iM}^{n-1}, \quad F_{i(1+M)}^n = (-F_{ij}^{n-1})F_{ij}^{n-1}, \quad \ldots \quad F_{i(2M)}^2 = (-F_{iM}^{n-1})F_{iM}^{n-1}$$

$$F_{(i+M)1}^n = F_{i(1+M)}^n, \quad \ldots \quad F_{(i+M)M}^n = F_{i(2M)}^n, \quad F_{(i+M)(1+M)}^n = F_{ij}^n, \quad \ldots \quad F_{(i+M)(2M)}^n = F_{iM}^n$$

ZCZ Sequence Set Construction-II

In order to extend the Construction I, instead of starter, $$F^0 = \begin{bmatrix} F_{11}^0 & F_{12}^0 \\ F_{21}^0 & F_{22}^0 \end{bmatrix}_{2 \times 2} = \begin{bmatrix} -1 & 1 \\ -1 & -1 \end{bmatrix}_{2 \times 2}$$

one can use any starter of order m as defined below, $$F^0 = \begin{bmatrix} F_{11}^0 & F_{12}^0 \\ F_{21}^0 & F_{22}^0 \end{bmatrix} = \begin{bmatrix} -X^m & Y^m \\ -\overleftarrow{Y^m} & -\overleftarrow{X^m} \end{bmatrix}_{2 \times 2^{m+1}}$$

where $\overleftarrow{Y^m}$ denotes the reverse of sequence $Y^m$, $X^m$ and $Y^m$ is defined recursively by $$[X^0, Y^0] = [1, 1]$$

$$[X^m, Y^m] = [X^{m-1}Y^{m-1}, (-X^{m-1})Y^{m-1}]$$

By using the same recursive formula as defined above, a ZCZ sequence set $F(L,M,Z_{CZ})=(2^{2n+m}L_0, 2^{n+1}, 2^{n+m}+1)$ can be synthesized.

As an example, consider m=2, n=1, one can obtain the following ZCZ set $F(L,M,Z_{CZ})=(32, 4, 9)$.

$$S_1 = \{++-+++-+---+---+--+-++-+++-+---+\}$$

$$S_2 = \{--+-++-++++----+++-+++-+---+---+\}$$

$$S_3 = \{+---+---+--+--++++--+-++-+--\}$$

$$R_{ACF} = \{\text{XXXXXXXXXXXX} \ 0000 \ 32 \ 0000 \ \text{XXXXXXXXXXXX}\}$$

$$R_{CCF} = \{\text{XXXXXXXXXXXX} \ 0000 \ \ 0 \ 0000 \ \text{XXXXXXXXXXXX}\}$$

As another example, consider m=1, n=2, one can obtain the following ZCZ set $F(L,M,Z_{CZ})=(64, 8, 9)$.

$$S_1 = \{------+-+-+-+++--++--+-++-+++++----+-+---+-++++--++-+-+\}$$

$$S_2 = \{++++---+-+-+--++++--++-+-----+---+-+-+++--++--+-++--+\}$$

$$S_3 = \{++-++---++-+--------+-+-+++--+-+++++----+-+---+\}$$

$$S_4 = \{-++++--++-+-++++----+-+---+++---++-+-++-+-------+-+-+\}$$

$$S_5 = \{+-+-++---+--++--+++--++-+-+--+-+++++--++-+--+-++++--\}$$

$$S_6 = \{+-+-+-+++++---++-+---+++++-+-+-+---+---++--+++--++--\}$$

$$S_7 = \{+---++-+++-++--+-+-+----++-+-+-++++--+-+-+-+++++----\}$$

$$S_8 = \{-+++-+-+-++++-+-+-+-+++++----+-++-+++--++--+-+-+-+------\}$$

$$R_{ACF} = \{\text{XXXXXXXXXXXXXXXXXXXXXXXXXXXX} \ 0000 \ 64 \ 0000 \ \text{XXXXXXXXXXXXXXXXXXXXXXXXXXXX}\}$$

$$R_{CCF} = \{\text{XXXXXXXXXXXXXXXXXXXXXXXXXXXX} \ 0000 \ 6 \ 0000 \ \text{XXXXXXXXXXXXXXXXXXXXXXXXXXXX}\}$$

ZCZ Sequence Set Construction-III

By using the third construction, a ZCZ spreading sequence set is formed by truncating a set of sequences with longer length, according certain rule.

Suppose a ZCZ sequence set $F(L,M,Z_{CZ})=(2^{2n+m} L_0, 2^{n+1}, 2^{n+m}+1)$ is obtained by using the Construction I or Construction II, then we can synthesize a shorter ZCZ code with the same family size and smaller ZCZ by simply halving each sequence t times in set $F^n$, resulting a code set $F(L,M, Z^{cz})=(2^{2n+m-t} L_0, 2^{n+1}, 2^{n+m-t}+1)$, where $t \leq n$ for $n>0$, or $t \leq m$ for $n=0$.

Let n=2, m=0, by using the example code set $F(L,M,Z_{CZ})=(2^{2n+m} L_0, 2^{n+1}, 2^{n+m}+1)=(32,8,5)$ derived above, two other ZCZ sets can be synthesized by truncation,

| | |
|---|---|
| $F(L, M, Z_{CZ}) =$ (32, 8, 5): (t = 0, no truncation) | $S_1 = \{----++++ +-+--+-+ ++----++-++-+--+\}$ <br> $S_2 = \{++----++ -++-+--+ ----++++-+--+-+\}$ <br> $S_3 = \{+-+--+-+ ----++++ -++-+--++----++\}$ <br> $S_4 = \{-++-+--+ ++----++ +-+--+-+----++++\}$ <br> $S_5 = \{-------- +-+-+-+- ++--++----++--++-\}$ <br> $S_6 = \{++--++-- -++-++-- --------+-+-+-+-\}$ <br> $S_7 = \{+-+-+-+- -------- -++-++--++--++--\}$ <br> $S_8 = \{-++--++-- ++--++-- +-+-+-+--------\}$ <br> $R_{ACF} = \{xxxxxxxxxxxxxx 00 32 00 xxxxxxxxxxxxxx\}$ <br> $R_{ACF} = \{xxxxxxxxxxxxxx 00\ 0\ \ 00 xxxxxxxxxxxxxx\}$ |
| $F(L, M, Z_{CZ}) =$ (16, 8, 3): (t = 1, 1st truncation) | $S_1 = \{----++++ +-+--+-+\}$ <br> $S_2 = \{++----++ -++-+--+\}$ <br> $S_3 = \{+-+--+-+ ----++++\}$ <br> $S_4 = \{-++-+--+ ++----++\}$ <br> $S_5 = \{-------- +-+-+-+-\}$ <br> $S_6 = \{++--++-- -++-++--\}$ <br> $S_7 = \{+-+-+-+- --------\}$ <br> $S_8 = \{-++-++-- ++--++--\}$ <br> $R_{ACF} = \{xxxxxxx 0 16 0 xxxxxxx\}$ <br> $R_{CCF} = \{xxxxxxx 0\ 0\ \ 0 xxxxxxx\}$ |
| $F(L, M, Z_{CZ}) =$ (8, 8, 1): (t = 2, 2nd truncation) | $S_1 = \{----++++\}$ <br> $S_2 = \{++----++\}$ <br> $S_3 = \{+-+--+-+\}$ <br> $S_4 = \{-++-+--+\}$ <br> $S_5 = \{--------\}$ <br> $S_6 = \{++--++--\}$ <br> $S_7 = \{+-+-+-+-\}$ <br> $S_8 = \{-++-++--\}$ <br> $R_{ACF} \{xxxx 8 xxxx\}$ <br> $R_{CCF} \{xxxx 0 xxxx\}$ |

Let n=0, m=4. From the code set $F(L,M,Z_{CZ})=(2^{2n+m} L_0, 2^{n+1}, 2^{n+m}+1)=(32,2,17)$, four other sets can be synthesized as shown below,

| | |
|---|---|
| $F(L, M, Z_{CZ}) =$ (32, 2, 17): (t = 0, no truncation) | $S_1 = \{++-+---+--+----+--+-+++---+----+\}$ <br> $S_2 = \{+----+---+++-+---++++-++-+++-+--\}$ <br> $R_{ACF} = \{xxxxxxxx 00000000 32 00000000 xxxxxxxx\}$ <br> $R_{CCF} = \{xxxxxxxx 00000000\ 0\ 00000000 xxxxxxxx\}$ |
| $F(L, M, Z_{CZ}) =$ (16, 2, 9): (t = 1, 1st truncation) | $S_1 = \{++-+---+--+----+\}$ <br> $S_2 = \{+----+---+++-+--\}$ <br> $R_{ACF} = \{xxxx 0000 16 0000 xxxx\}$ <br> $R_{CCF} = \{xxxx 0000 0\ \ 0000 xxxx\}$ |
| $F(L, M, Z_{CZ}) =$ (8, 2, 5): (t = 2, 2nd truncation) | $S_1 = \{++-+---+\}$ <br> $S_2 = \{+----+--\}$ <br> $R_{ACF} = \{xx 00 8 00 xx\}$ <br> $R_{CCF} = \{xx 00 0 00 xx\}$ |
| $F(L, M, Z_{CZ}) =$ (4, 2, 3): (t = 3, 3rd truncation) | $S_1 = \{++-+\}$ <br> $S_2 = \{+---\}$ <br> $R_{ACF} = \{x 0 4 0 x\}$ <br> $R_{CCF} = \{x 0 0 0 x\}$ |
| $F(L, M, Z_{CZ}) =$ (2, 2, 1): (t = 4, 4th truncation) | $S_1 = \{++\}$ <br> $S_2 = \{+-\}$ <br> $R_{ACF} = \{x 2 x\}$ <br> $R_{CCF} = \{x 0 x\}$ |

Let n=1, m=2. From the code set $F(L,M,Z_{CZ})=(2^{2n+m} L_0, 2^{n+1}, 2^{n+m}+1)= (32,4,9)$, another set can be synthesized as shown below,

| | |
|---|---|
| $F(L, M, Z_{CZ}) =$ (32, 4, 9): (t = 0, no truncation) | $S_1 = \{++-+++-+----+---+ --+-++-++++----+\}$ <br> $S_2 = \{--+-++-++++----+ ++-+++-+----+---+\}$ <br> $S_3 = \{+----+----+---+-- -++++---+-++-+--\}$ <br> $S_4 = \{-++++---+-++-+-- +----+----+---+--\}$ <br> $R_{ACF} = \{xxxxxxxxxxxx 0000 32 0000 xxxxxxxxxxxx\}$ <br> $R_{CCF} = \{xxxxxxxxxxxx 0000\ 0\ \ 0000 xxxxxxxxxxxx\}$ |
| $F(L, M, Z_{CZ}) =$ (16, 4, 5): (t = 1, 1st truncation) | $S_1 = \{++-+++-+----+---+\}$ <br> $S_2 = \{--+-++-++++----+\}$ <br> $S_3 = \{+----+----+---+--\}$ <br> $S_4 = \{-++++---+-++-+--\}$ <br> $R_{ACF} = \{xxxxxx 00 16 00 xxxxxx\}$ <br> $R_{ACF} = \{xxxxxx 00\ \ 0\ \ \ 00 xxxxxx\}$ |

However, the ZCZ set $F(L,M,Z_{CZ})=(16,4,5)$ cannot be truncated further because of the limitation $t \leq n$ for $n>0$.

Other ZCZ Sequence Set Constructions

In general, for any given starter $F^0$ of length $2^{m+1}$, a ZCZ code set $F(L,M, Z_{CZ})=(2^{2n+m-t} L_0, 2^{n+1}, 2^{n+m-t}+1)$ can be constructed by using Construction I–III, where $L_0=2$, $t \leq n$ for $n>0$, or $t \leq m$ for $n=0$. It should be noted that, in these constructions, the ZCZ is given by $Z_{CZ}=L/M+1=2^{2n+m-t} L_0/2^{n+1}+1=2^{n+m-t}+1$, for $L>M>1$; or $Z_{CZ}=1$ for $L=M$. Therefore, one can write the ZCZ code set as $F(L,M, Z_{CZ})=(L,M,L/M+1)$ for $L>M>1$, or $F(L,M, Z_{CZ})=(L,M,1)$ for $L=M$.

Similarly, by using other basic starters with length $L_0=20$ or $L_0=52$, as shown below, different ZCZ sequence sets can be constructed.

$$F^0 = \begin{bmatrix} F^0_{11} & F^0_{12} \\ F^0_{21} & F^0_{22} \end{bmatrix}_{2\times 2} = \begin{bmatrix} +--+-+---+ & +-------+-- \\ -++--------+ & -+++-+--++- \end{bmatrix}_{2\times 20}$$

$$F^0 = \begin{bmatrix} F^0_{11} & F^0_{12} \\ F^0_{21} & F^0_{22} \end{bmatrix}_{2\times 2} = \begin{bmatrix} +++--+++-+------+-++--+---- & ---++---+--++-+-+-++--+---- \\ ----+--++-+-+-++-+---++--- & ++++-++---+-+++++-+---++---- \end{bmatrix}_{2\times 52}$$

In the resulting ZCZ code set $F(L,M, Z_{CZ})=(2^{2n+m-t} L_0, 2^{2n+1}, Z_{CZ})$, the basic length $L_0$ should be replaced with 20 or 52, and the ZCZ is normally less than or equal to $L/M+1$, i.e. $Z_{CZ} \leq L/M+1$.

Adaptive Interference-Free Direct Sequence Spread Spectrum System

A new type adaptive interference-free direct sequence spread spectrum (AIF-DS-SS) system is proposed in this patent. The AIF-DS-SS is an interference-free system, because the system works in a state in which the spreading sequences have zero Auto-Correlation Functions (ACFs) and Cross-Correlation Functions (CCFs). The AIF-DS-SS is an adaptive system, because the system uses adaptively the desired spreading sequences with variable ZCZ properties according to channel conditions, and thus providing optimal performance under various channel conditions. If the channel condition is getting worse, one can enlarge the zero correlation zone (ZCZ) by choosing a smaller set of ZCZ sequences, otherwise one can reduce the ZCZ in order to accommodate more users.

For a given sequence length L, one can construct different sets of sequences with different family size M and zero correlation zone $Z_{CZ}$, which can be used in the same AIF-DS-SS system to provide different protection against multipath and to provide different system capacity. For a practical SS system, let L=65536, then the possible size M and $Z_{CZ}$ are given by Table 1. If one choose M=128, then all the ACFs and CCFs among the sequence set will have zero correlation zone $Z_{CZ}$=513. If channel becomes better, one can use a sequence set $F(L,M, Z_{CZ})=(65536,256,257)$; if the channel becomes worse, one can skip to $F(L,M, Z_{CZ})=(65536,64,1025)$ set, and so on.

TABLE 1

Adaptation of M and $Z_{cz}$ for a given L

| No. | Length L | Size M | ZCZ $Z_{cz}$ |
|---|---|---|---|
| 1 | 65536 | 65536 | 1 |
| 2 | 65536 | 32768 | 3 |
| 3 | 65536 | 16384 | 5 |
| 4 | 65536 | 8192 | 9 |
| 5 | 65536 | 4096 | 17 |
| 6 | 65536 | 2048 | 33 |
| 7 | 65536 | 1024 | 65 |
| 8 | 65536 | 512 | 129 |
| 9 | 65536 | 256 | 257 |
| 10 | 65536 | 128 | 513 |
| 11 | 65536 | 64 | 1025 |
| 12 | 65536 | 32 | 2049 |
| 13 | 65536 | 16 | 4097 |
| 14 | 65536 | 8 | 8193 |
| 15 | 65536 | 4 | 16385 |
| 16 | 65536 | 2 | 32769 |
| 17 | 65536 | 1 | 65535 |

For a given family size M, i.e. for a fixed number of sequences in the ZCZ code set, or equivalently the number of subscribers in the AIF-DS-SS system, one can construct different sets of sequences with different lengths L and zero correlation zones $Z_{CZ}$ which can be used in the AIF-DS-SS system to provide different levels of protection against multipath and other counter-measures. As an illustrating example, let M=16, then some of the possible lengths L and zero correlation zones $Z_{CZ}$ are listed in Table 2. It is assumed here that the system has 16 subscribers. Each subscriber is allocated a set of sequences with different lengths L and ZCZ $Z_{CZ}$. Suppose that the sequence of length L=320 is used in the normal channel condition, then all the ACFs and CCFs will have zero correlation zone $Z_{CZ}$=21. If channel becomes better, every active user will be informed by the system to change his spreading sequence of length L=320 to another spreading sequence of length L=256, 160, 128, . . . ; if the channel becomes worse, every active subscriber should switch his sequence to another sequence with longer length, hence bigger zero correlation zone.

TABLE 2

Adaptation of L and $Z_{cz}$ for a given M

| No. | Length L | Size M | ZCZ $Z_{cz}$ |
|---|---|---|---|
| 1 | 16 | 16 | 1 |
| 2 | 32 | 16 | 3 |
| 3 | 64 | 16 | 5 |
| 4 | 128 | 16 | 9 |
| 5 | 160 | 16 | 7 |
| 6 | 256 | 16 | 17 |
| 7 | 320 | 16 | 21 |
| 8 | 416 | 16 | 27 |
| 9 | 512 | 16 | 33 |
| 10 | 640 | 16 | 41 |
| 11 | 832 | 16 | 53 |
| 12 | 1024 | 16 | 65 |
| 13 | 1280 | 16 | 81 |
| 14 | 1664 | 16 | 105 |
| . . . | . . . | . . . | . . . |

Figure 3:
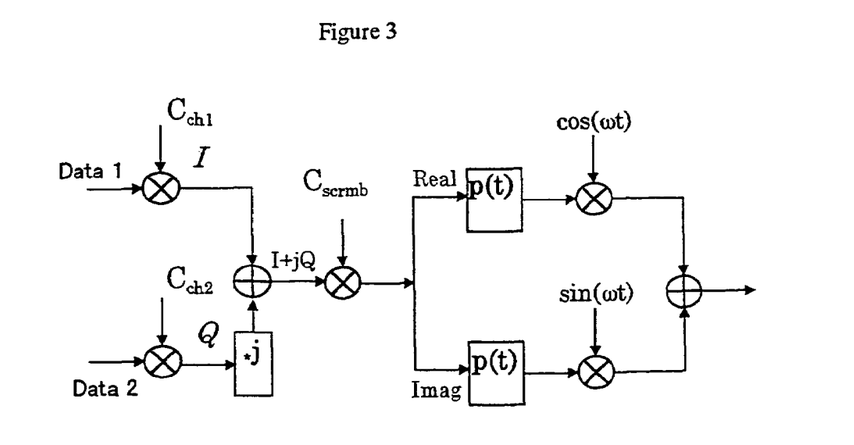
FIG. 3 shows the two levels of spectrum spreading at the transmitter. The first level spread code is called channelization code sequence, and the second level spread code is called scrambling code sequence.
Figure 4:
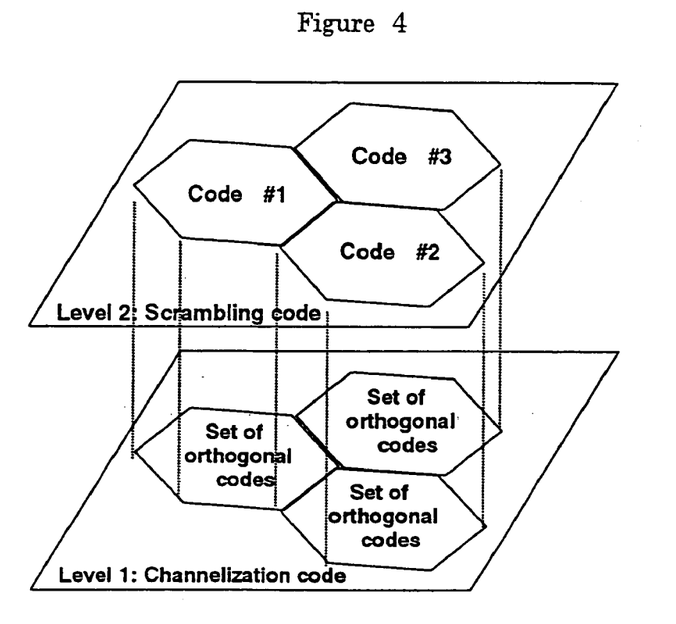
FIG. 4 shows the intercell and intracell code assignment. At the first level (or layer), a set of orthogonal codes is normally assigned to users in the same cell for discrimination. At the second level, m-sequences are normally for intercell synchronous operation, Gold code and large Kasami sequences are common candidates for intercell asynchronous operation.

Anti-Multipath-Interference DS CDMA System by Employing Channelization ZCZ Codes It is well-known that, in commercial narrow band and wide band CDMA system, in order to provide flexible system deployment and operation, there are normally two levels of spectrum spreading, each level required different spreading code allocation, as shown in FIG. 3 and FIG. 4. By using the multilevel spreading, it is possible to provide waveform orthogonality (at the first level) among all users of the same cell while maintaining mutual randomness (at the second level) only between users of the different cells.

The orthogonality at the first level is normally achieved by multiplying each user's binary input by a short spread sequence (channelization code) which is orthogonal to that of every other user of the same cell. The first level is called channelization. The short orthogonal spread codes used are normally Walsh orthogonal code or variable-length orthogonal code. The variable-length orthogonal code is a modified Walsh code.

However, in the first spreading level, the spreading codes used in every DS CDMA system are either Walsh code or extended Walsh code which can only provide orthogonality at the in-phase shift. As the number of resolvable propagation paths increases, the orthogonality among different users tends to diminish because of increasing inter-path interference and because of the small correlation zone ($Z_{CZ}$=1) of the Walsh code and modified Walsh code.

By employing the invented ZCZ code with big ZCZ ($Z_{CZ}$>1), the orthogonality among different users of the same cell can be maintained even the multipath problem get more serious. In other words, by allocating the ZCZ code of this invention to all the intracell users, the DS CDMA system will be more tolerant to the multipath interference, and the orthogonality can be achieved in a wide range of channel conditions.

Anti-Multiple-Access-Interference DS CDMA System by Employing Scrambling ZCZ Codes The mutual randomness at the second level is normally achieved by multiplication of a long pseudorandom sequence (scrambling code) which is cell-specific but common to all users of that cell in the down-link and user-specific in the uplink. The common scrambling code candidates used are maximal length code (m-sequences), Gold code and very large Kasami code.

Because the cells in the DS CDMA system are assigned to different scrambling codes, each cell site can use short spreading codes independent from other cells. In intercell synchronous operation, as is the case of IS-95-based systems and North American W-CDMA systems, different cell base stations and different mobile users use different time shifts of the same long sequence in the down-link and up-link. On the other hand, in intercell asynchronous operation, as is the case of European and Japanese W-CDMA system, different cell base stations and different mobile users use different long scrambling code sequences.

However, no matter the m-sequences, Gold codes or very large Kasami codes are used as scrambling codes, the multiple access interference is always a major problem because the cross-correlation values of these sequences are not zeroes. By using the invented ZCZ codes as scrambling codes, the system can work in an optimal multiple access interference-free by using appropriate framing techniques will be described later.

For intercell synchronous operation, one can choose a single ZCZ code of length L with ZCZ $Z_{CZ}=L/2+1$, which should be better than m-sequence whose sidelobes are not zeroes. As an example, if the m-sequence of length $L=2^5-1=32767$ used in CDMA (IS-95) system is replaced with a ZCZ sequence of length $L=2^5=32768$, then there is a zero correlation zone $Z_{CZ}=16385$, and it is possible to find out a single sequence with bigger ZCZ. For intercell asynchronous operation, one can choose a set of ZCZ sequences with required ZCZ value as scrambling code, which will be better than Gold or large set Kasami sequences whose ACF sidelobes and CCF values are quite big.

Framing and Other Techniques for the System Implementation

Figure 5:
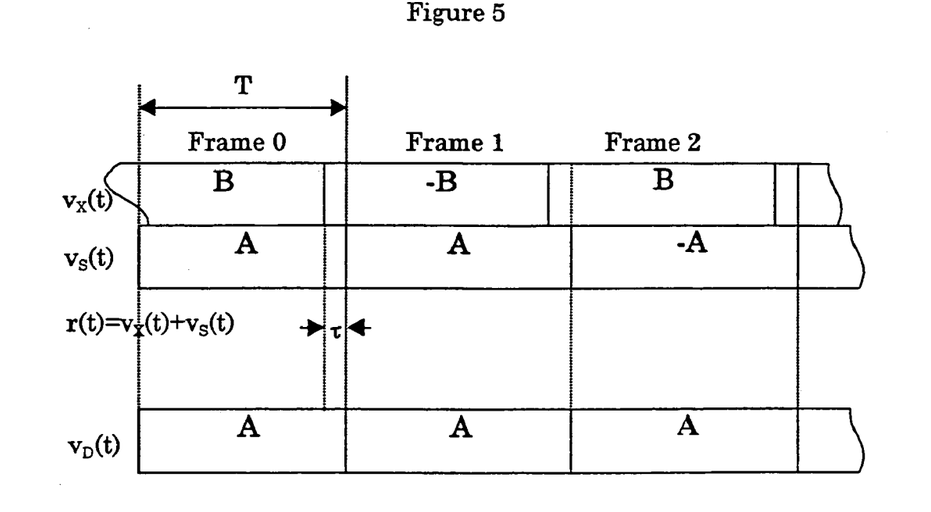
FIG. 5 shows the normal frame format which results multiple access interference and multipath interference.

The system using the ZCZ codes stated above can carry out interference-free operation only when the interference consists of periodic ZCZ code sequences. As shown in FIG. 5, if the receiver input consists of the desired signal $v_S(t)$ composed of a sequence. A and interference $v_X(t)$ composed of another sequence B, where the sequence A and B are modulated to A, –A, B and –B by binary information independently, and A is delayed from B by τ, because of asynchronous operation or multipath effect. When this input is demodulated by the receiver, the despreading signal $v_D(t)$ composed of the sequence A that is synchronous to $v_S(t)$ is used. It is assumed that the synchronization is maintained by a conventional technique. Since $v_X(t)$ and $v_D(t)$ are in general asynchronous, it results in producing aperiodic CCF in the demodulation process. It is noted that the aperiodic CCF of the ZCZ code as stated above does not have ZCZ or its ZCZ is very small.

Figure 6:
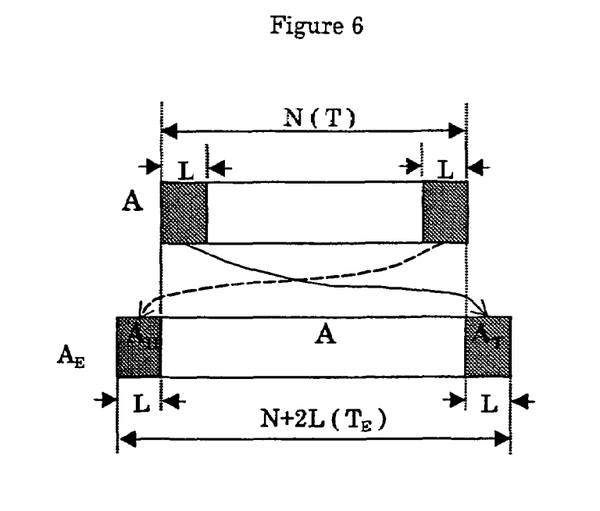
FIG. 6 is a diagram schematically showing the extended frame structure which overcomes the interference problems due to multiple access and multipath by employing the periodic ZCZ codes.

To overcome this problem, the system is designed so that the delay time may be limited less than a threshold, and an extended frame format is used. The former can be achieved by sending some timing control signals to mobile stations from the base station in down-link channel of cellular CDMA system. The latter is solved as follows. The spreading sequence A with N chips is incorporated into an extended frame $A_E$ which is made by enclosing the sequence A with the L clip-heading part $A_H$ and the L clip-tail part $A_T$ as shown in FIG. 6. All the transmitting frames are composed in this way.

Figure 7:
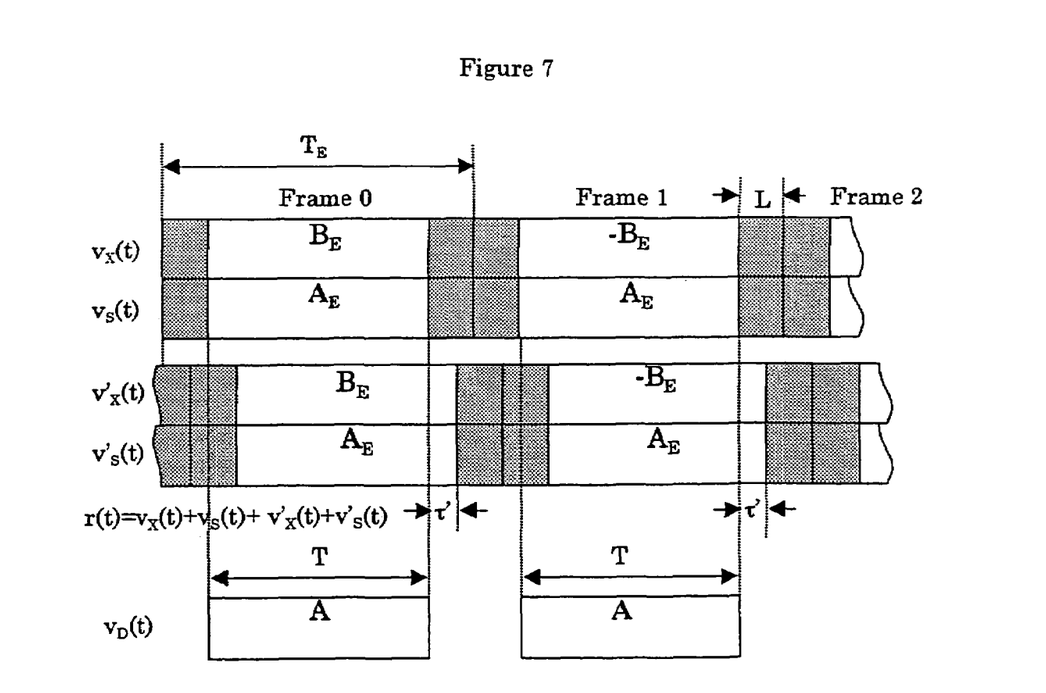
FIG. 7 gives an example of interference-free operation in down-link transmission.

FIG. 7 shows an example of receiver input in down-link transmission of a cellular CDMA, when all the signals are transmitted synchronously from the base station. It is assumed that the inter-cell interference is neglected here.

As a result, the desired signal $v_S(t)$ and the interference $v_X(t)$ are received at the same time. However, considering multipath effect, the delayed signals $v'_S(t)$ and $v'_X(t)$ are also received with delay τ' and they are considered as interference in the demodulation process.

If the extended frames are used for transmission, and despreading signal $v_D(t)$ synchronous to $v_S(t)$ is used at the receiver, the boundary between the extended sequences $B_E$ and $–B_E$ does not fall in the despreading sequence A of $v_D(t)$. As long as |τ'|<$LT_C$ ($T_C$ is the chip period), the interference sequences such as $B_E$ are viewed as periodic sequences for demodulation.

Figure 8:
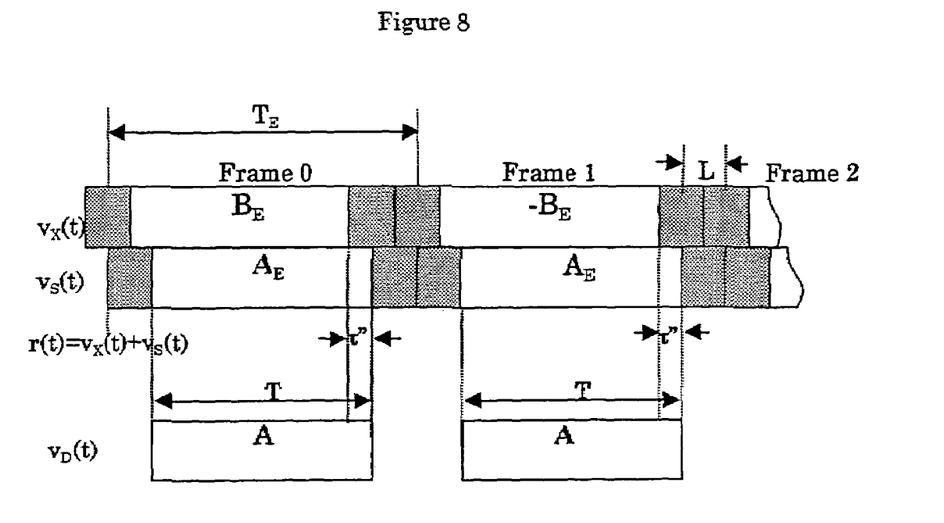
FIG. 8 shows an example of interference-free operation in up-link transmission.

FIG. 8 shows another example of this idea, the up-link transmission signals from the mobile stations in a cell are asynchronously transmitted to the base station, where multipath effect is neglected for simplicity. In this case, the difference of arriving time between the desired signal and the interference is denoted by τ". Similarly to the down-link case with multipath, as long as |τ"|<$LT_C$ is maintained, the interference can be viewed periodic. If multipath effect exists, the following condition should be maintained, i.e.

$$\tau = \max\{\tau', \tau''\} < LT_C, \begin{pmatrix} \tau': \text{delay due to multipath} \\ \tau'': \text{delay due to asynchronous access} \end{pmatrix}$$

By using the synchronizing techniques stated above, the system with ZCZ codes can operate in the state of interference-free. As explained above, this system is very useful when applied for not only up-link (asynchronous) transmission but also down-link (synchronous) transmission with multipath effect.

In order for the DS CDMA system to be adaptive to the channel conditions, each transmitter at the base station and mobile station can be allocated either one ZCZ spreading sequence or several ZCZ spreading sequences with different ZCZ.

Figures 9, 9A:
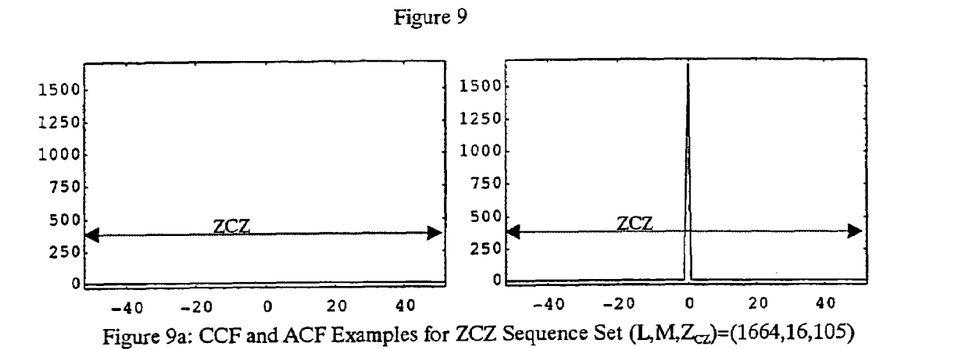
FIG. 9a to FIG. 9f are diagrams respectively showing the partial periodic correlation functions for ZCZ codes F(1664, 16,105), F(1280,16,81), F(1024,16,65), F(832,16,53), F(640,16,41) and F(512,16,33).
Figure 9B:
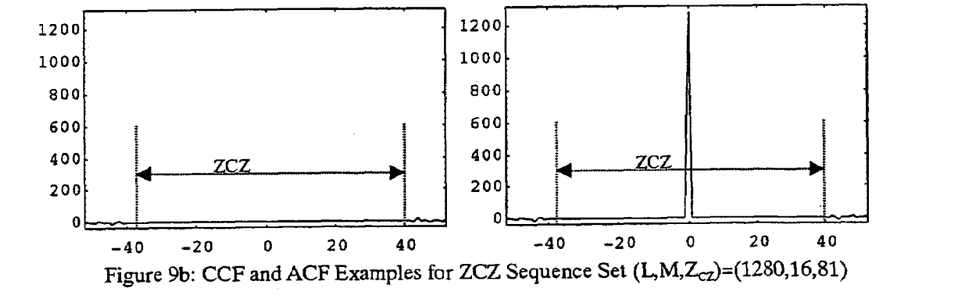
Figure 9C:
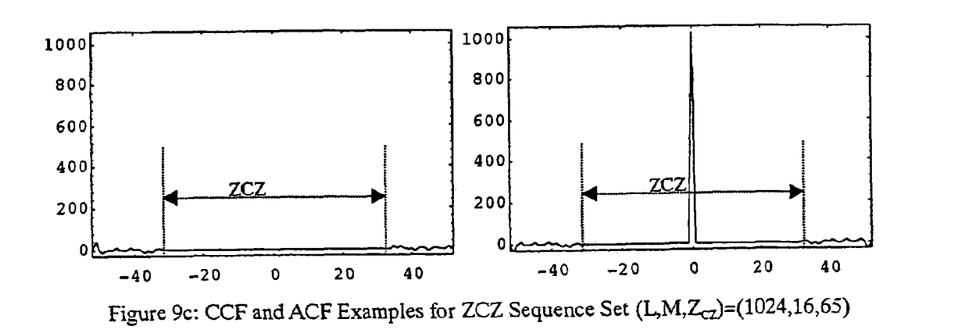
Figure 9D:
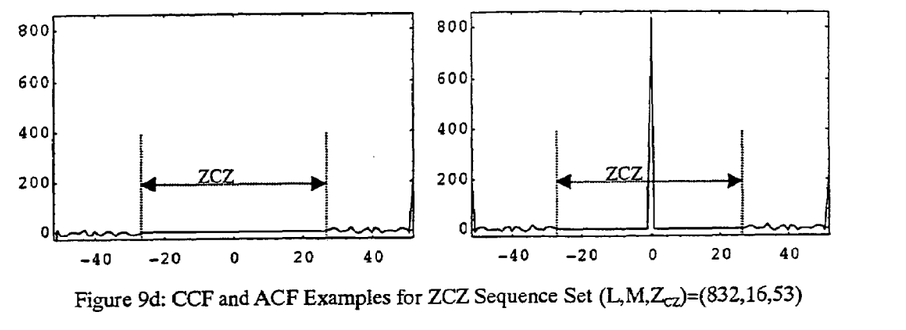
Figure 9E:
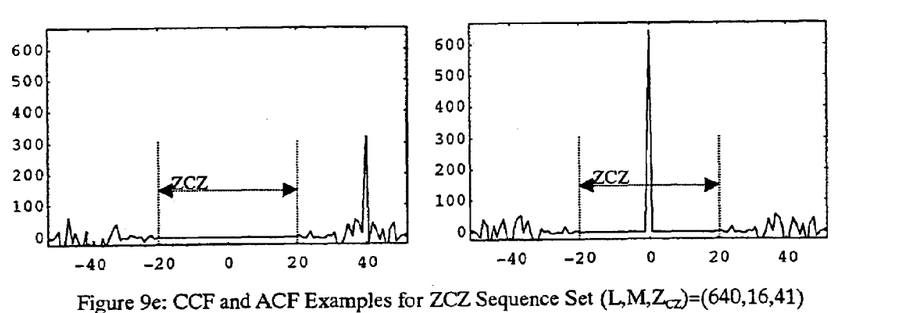
Figure 9F:
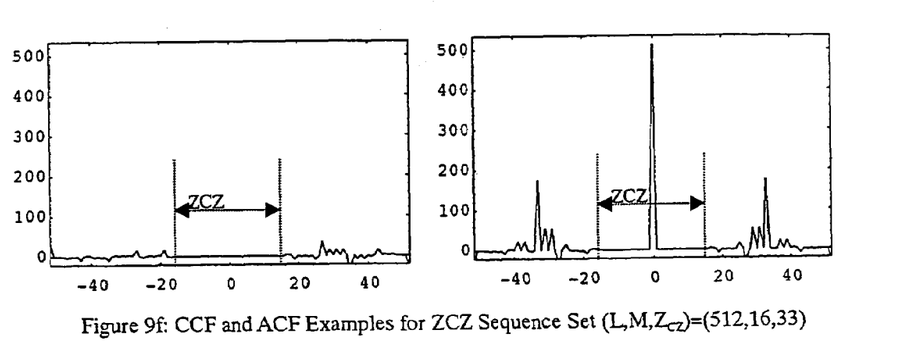
Figures 10, 10A:
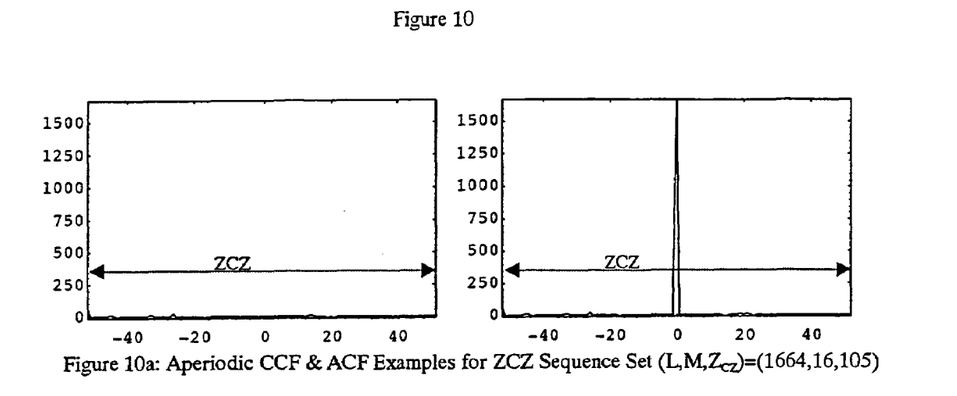
FIG. 10a to FIG. 10f are diagrams respectively showing the partial aperiodic correlation functions for ZCZ codes F(1664,16,105), F(1280,16,81), F(1024,16,65), F(832,16, 53), F(640,16,41) and F(512,16,33).
Figure 10B:
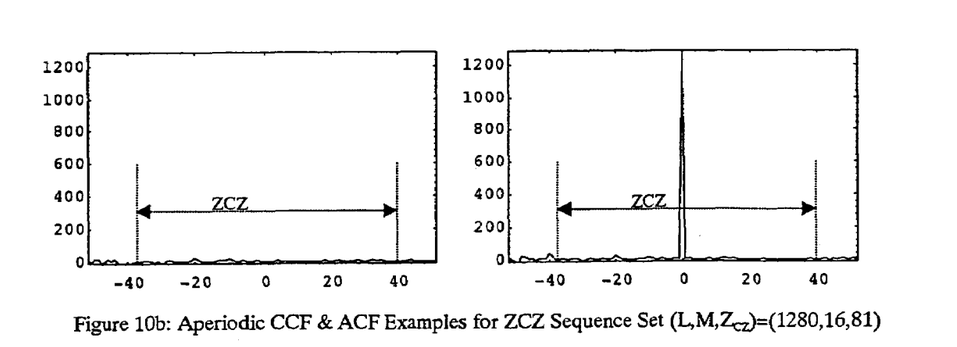
Figure 10C:
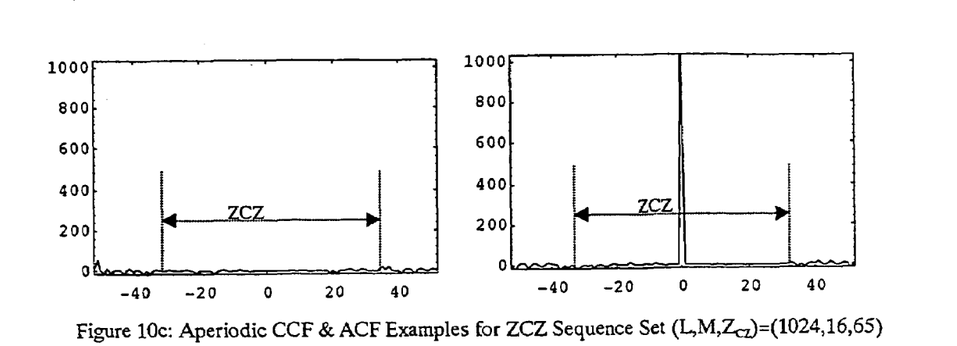
Figure 10D:
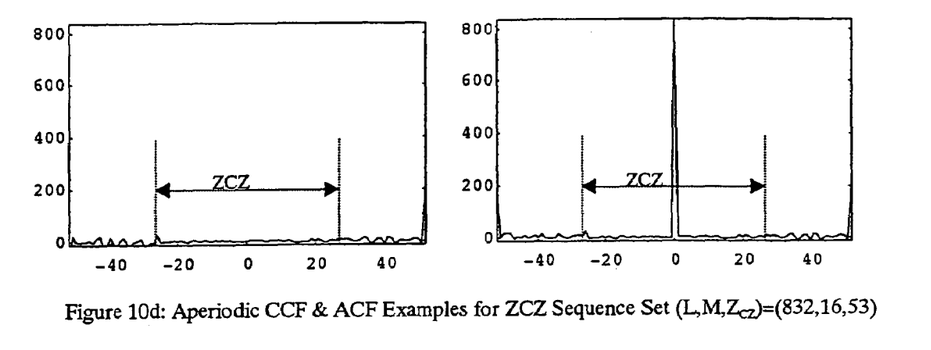
Figure 10E:
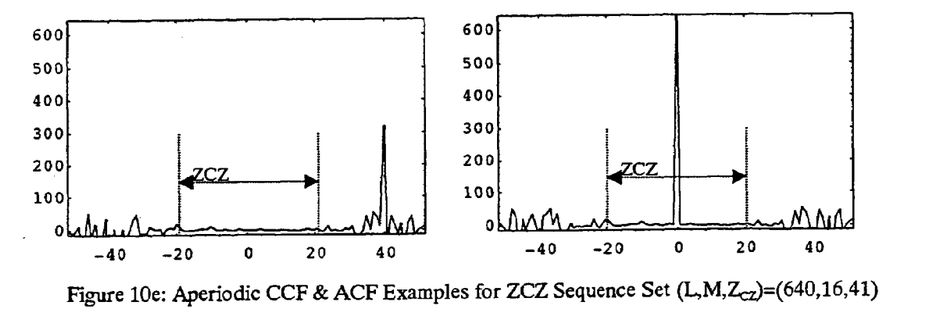
Figure 10F:
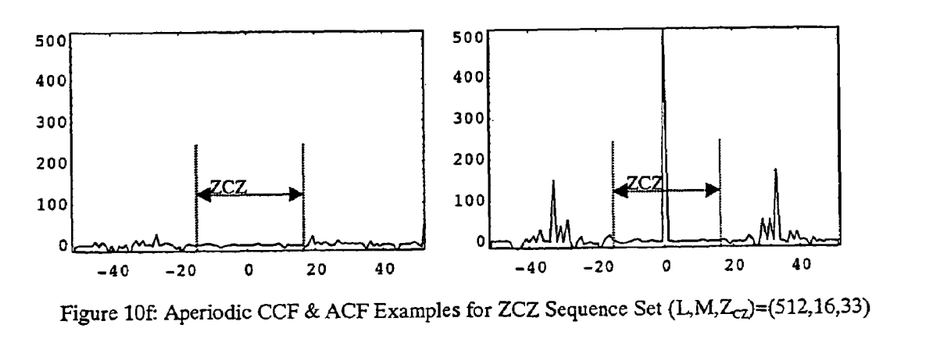

It should be noted that the ZCZ spreading code sequences presented above have not only an ideal zero correlation zone, as shown in FIG. 9, but also a very small, although not identical zero, aperiodic correlations within the ZCZ region, as shown in FIG. 10.

What is claimed is:

1. A binary coded direct sequence spread spectrum communication system comprising a means for generating a binary spreading sequence set of length L and size M used in the system having a zero correlation zone $Z_{CZ}$ in their periodic autocorrelation functions on both sides of the zero shift and a zero correlation zone $Z_{CZ}$ in the periodic cross-correlation functions including the zero shift between any pair of spreading sequences belonging to the code sequence set wherein said binary spreading sequence set has length $L=2\times2^i\times10^j\times26^k$, where i, j, k can be zeroes or any positive integers, and family size 2<M<L, and zero correlation zone $Z_{CZ} \leq L/M+1$ for any permitted values of i, j, k, or $Z_{CZ}=L/$ M+1 for j=k=0 and any permitted value of i and comprises ZCZ sequence(s) and further comprises a means for generating a central frame by multiplying a binary input and said ZCZ sequence(s), and additional guard sequences enclosing the central frame, said additional guard sequence being extracted from parts of the central frame.

2. A binary coded direct sequence spread spectrum communication system which is characterized by the fact that in the binary spread spectrum communication system according to claim 1, said spreading sequences ae formed recursively from a starter set with two sequences of length 2 and zero correlation zone $Z_{CZ}=1$ or length L>2 with zero correlation zone $Z_{CZ}=L/2+1$, or formed by half-truncating a set of ZCZ sequences where the maximum number of truncations are equal to the number of recursions used in constructing the ZCZ sequence set.

3. A cellular binary coded direct sequence CDMA communication system which is characterized by the fact that, a channelization spreading sequences of all users communicating in the same cell are chosen from a ZCZ code sequence set as claimed in claim 1 or 2.

4. A cellular binary coded direct sequence CDMA communication system which is characterized by the fact that, a binary ZCZ sequence set as claimed in claim 1 or 2 and of length L with $Z_{CZ} \geq L/2+1$ is chosen as a scrambling code sequence used for intercell synchronous operation.

5. A cellular binary coded direct sequence CDMA communication system which is characterized by the fact that, a scrambling code sequences used for intercell asynchronous operation are chosen from a ZCZ code sequence set as claimed in claim 1 or 2.

6. The cellular binary coded direct sequence CDMA communication system according to claim 3 wherein each transmitter at the base station and mobile station is allocated a single ZCZ spreading sequence or a subset of said ZCZ spreading sequences chosen from a ZCZ code set.

7. The cellular binary coded direct sequence CDMA communication system according to claim 3 wherein a down-link communication under the condition of synchronous transmission and an up-link communication under the condition of asynchronous transmission is utilized.

8. The cellular binary coded direct sequence CDMA communication system according to claim 5 which is characterized by the fact that each transmitter at the base station and mobile station is allocated a single ZCZ spreading sequence or a subset of ZCZ spreading sequences chosen from a ZCZ code set as claimed in claim 1 or 2.

9. The cellular binary coded direct sequence CDMA communication system according to claim 4 which is applied for down-link communication under the condition of synchronous transmission and for up-link communication under the condition of asynchronous transmission.

10. The cellular binary coded direct sequence CDMA communication system according to claim 5 which is applied for down-link communication under the condition of synchronous transmission and for up-link communication under the condition of asynchronous transmission.

11. The cellular binary coded direct sequence CDMA communication system according to claim 6 which is applied for down-link communication under the condition of synchronous transmission and for up-link communication under the condition of asynchronous transmission.

* * * * *